June 3, 1958  R. G. ALLEN  2,837,118
VALVE OPERATING MECHANISM
Filed Nov. 5, 1954  2 Sheets-Sheet 1

INVENTOR
RUSSELL G. ALLEN
BY
ATTORNEYS

June 3, 1958 R. G. ALLEN 2,837,118
VALVE OPERATING MECHANISM
Filed Nov. 5, 1954 2 Sheets-Sheet 2

INVENTOR
RUSSELL G. ALLEN
BY
ATTORNEYS

United States Patent Office 2,837,118
Patented June 3, 1958

2,837,118
VALVE OPERATING MECHANISM

Russell G. Allen, Godfrey, Ill., assignor to Owens-Illinois Glass Company, a corporation of Ohio Application November 5, 1954, Serial No. 467,048

3 Claims. (Cl. 137—632)

My invention relates to valves and valve operating mechanism. The invention provides means for adjusting and regulating the time of operation of a valve which may be operated automatically at predetermined time intervals. The invention is of utility as applied to a machine in which a valve and a valve actuating element are carried on relatively movable parts of the machine and periodically brought into cooperative relation for actuating the valve. The invention provides a valve operating lever or element which is actuated by a cam or the like, the valve operating element being adjustable by a vernier adjustment device which permits the timing of the valve operation to be accurately adjusted.

As herein illustrated the invention is adapted for use with and as forming a part of a glass blowing machine such as disclosed in my copending application titled, Adjusting Mechanism for Timing Devices, Serial No. 410,860, filed February 17, 1954. The present invention embodies certain improvements in the valve operating mechanism disclosed in said copending application.

Referring to the accompanying drawings.

Figure 1:
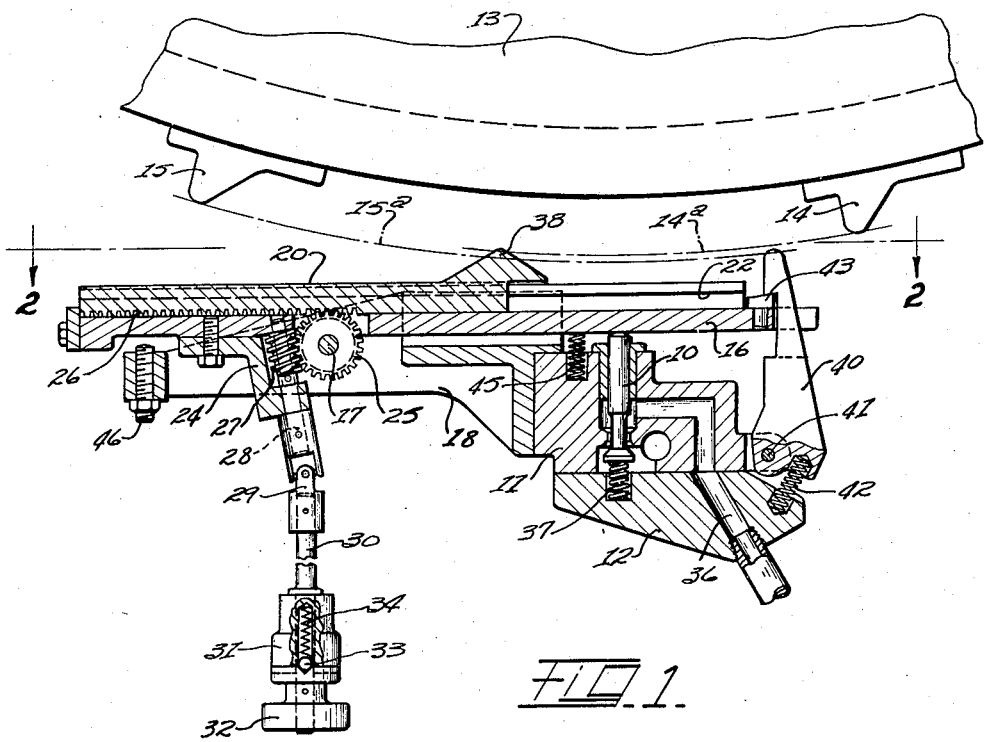
Fig. 1 is a part sectional plan view of a valve in open position, its operating mechanism and the machine to which it is applied.
Figure 2:
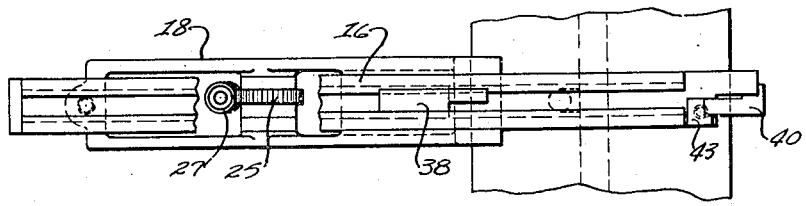
Fig. 2 is an elevational view showing the adjustable valve operating lever, as indicated by the line 2—2 on Fig. 1.

Referring to the drawings, an air valve 10 is mounted in a block 11 attached to a support 12 which may form part of a glass blowing unit. Such unit may be one of an annular series of blowing heads or units mounted for horizontal rotation about the axis of a stationary drum 13. The drum is provided with valve actuating lugs or cams 14 and 15. These lugs may be spaced at intervals circumferentially of the drum.

A valve operating lever 16 is mounted to swing about the axis of a pivot pin 17 journalled or mounted in a bracket arm 18 attached to the block 11. The lever 16 is formed with guideways 22 in which a rack bar 20 is slidably mounted for adjustment lengthwise of the lever.

A vernier adjusting means comprises a spur gear 25 mounted on the pivot pin 17 and running in mesh with rack teeeth 26 formed on the rack bar 20. The gear 25 is hobbed to run in mesh with a worm 27 on a worm sheet 28 journalled in a bracket 24. The shaft 28 is connected through a universal joint 29 to an adjusting rod 30 mounted in a non-rotatable bearing or support 31. The shaft 30 is rotatable by an adjusting hand knob 32 keyed thereto. The knob is held in its adjusted position by a detent 33 and spring 34.

Figure 3:
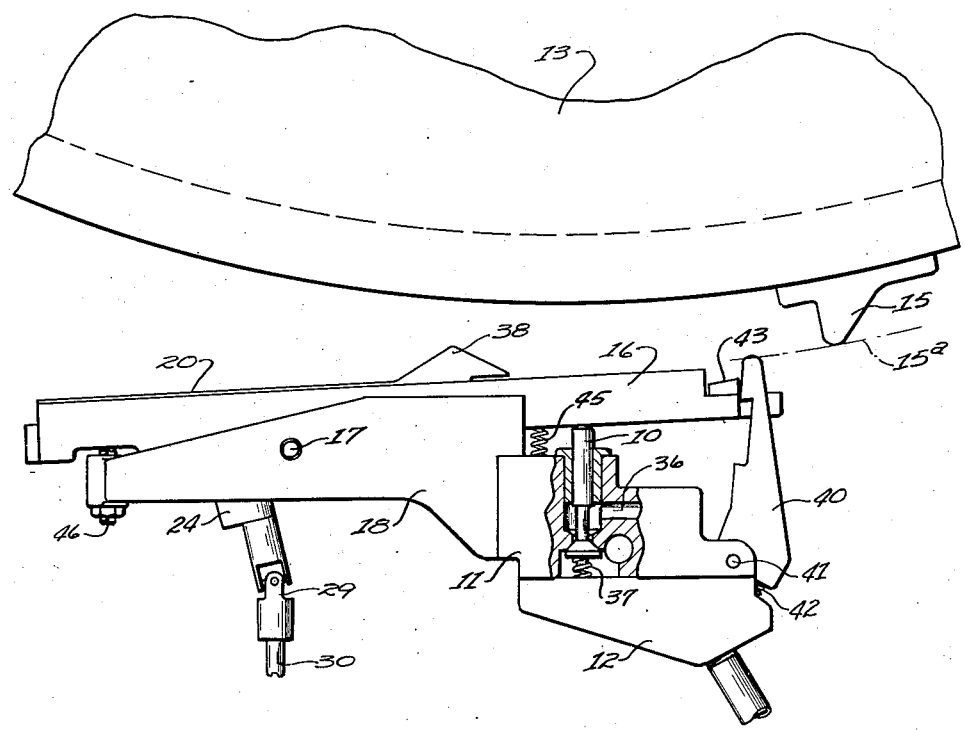
Fig. 3 is a part sectional plan view of mechanism shown in Fig. 1 but with the parts in a different position and the valve closed.

The valve 10 controls the flow of air under pressure through an air line 36. The valve is held in its closed position (Fig. 3) by a spring 37.

When the machine is in operation the valve mechanism, including the valve operating lever 16 and the head or unit 12 on which it is mounted, is rotated continuously about the vertical axis of the drum 13. During this rotation, which is in a clockwise direction, a cam lug 38, formed on the rack bar 20, is brought into contact with the lug 14 thereby swinging the lever about its fulcrum 17 and moving the valve 10 to open position (Fig. 1). A latch 40 pivoted at 41 on the head 11 is moved by a coil compression spring 42 into holding engagement with a keeper 43 on the lever 16 when the valve is opened and thereby holds the valve in open position. The valve is held open by the latch 40 until, during the travel of the head 12 about the axis of the drum, the latch strikes the tip of the lug 15 and is thereby released. This permits the lever to be swung outwardly by a coil compression spring 45 and the valve to close. It will be noted that the lug 15 projects a short distance farther than the lug 14 as indicated by the broken lines 15a and 14a respectively. This permits the latch to pass the lug 14 without contacting it. A stop screw 46 adjustable in the bracket arm 18 limits the swinging movement of the valve operating lever.

With the above described mechanism a fine adjustment of the valve operating lever is provided for accurately timing the opening movement of the valve.

The above described mechanism is found to be of utility when applied to a glass blowing machine such as above referred to in which a plurality of heads or units are arranged circumferentially of the drum 13. In such a machine some of the cylinders may work a little more sluggishly than others, resulting in a variation in the rotative position at which they operate. In the present invention, the adjusting devices permit the timing of the valve operations so that a single set of lugs 14 on the drum 13 can be used to operate all of the head units at the same point.

Modifications may be resorted to within the spirit and scope of my invention.

I claim:

1. The combination of a cylindrical drum having a vertical axis, a valve, a carrier in which the valve is mounted for movement to open and closed positions, a head on which said carrier is mounted, said head being rotative circumferentially of the drum, a horizontal lever pivotally mounted in said carrier for rocking movement about a vertical axis and comprising an arm extending horizontally between the valve and drum in position to operate the valve when the lever is rocked about its pivot, a pinion mounted for rotation about the fulcrum of said lever, a horizontal rack bar mounted on the lever for horizontal movement in the direction of its length and lengthwise of the lever and in mesh with said pinion, a worm meshing with said pinion, manual means for rotating said worm and thereby adjusting the rack bar, and cam lugs carried respectively by said rack bar and drum and operative by a relative movement of the said head and drum about the axis of said drum for actuating said lever and valve.

2. The apparatus defined in claim 1, said apparatus including a latch for holding the lever and valve in operative position, the said lug carried by the drum being in the path of the lug on the rack bar, and a second cam lug on the drum in the path of the said latch and operable to release the latch.

3. The combination of a cylindrical stationary drum having a vertical axis, a head positioned exteriorly of the drum and rotatable horizontally about the said axis, said head formed with a conduit extending therethrough for the circulation of a fluid, a valve mounted for lengthwise movement in said head in a horizontal direction radially of said drum into and out of a closed position in which it closes said conduit, spring means for moving the valve to closed position, a horizontal lever mounted on said head for rotation about a vertical axis, said lever extending between the valve and the drum and operable when rotated about its pivot in one direction to move the valve to open position, a spring loaded latch mounted on said head in position to engage the said lever and hold the lever in position to hold the valve open, a cam on said drum in the path of said latch and operable by rotation of said head to release the latch, permitting automatic closing of the valve, a horizontal bar slidably mounted for adjusting movement lengthwise of said lever, a cam on said bar, a second lug on the drum in the path of said cam, and a vernier adjusting means for adjusting the said bar in the direction of its length.

References Cited in the file of this patent

UNITED STATES PATENTS

| | | |
|---|---|---|
| 552,092 | Ayton | Dec. 31, 1895 |
| 1,032,194 | Evans | July 9, 1912 |
| 1,205,354 | Kadow | Nov. 21, 1916 |
| 1,852,692 | Bryant | Apr. 5, 1932 |
| 2,216,154 | Blaschke | Feb. 15, 1939 |